United States Patent
Demjanenko et al.

(10) Patent No.: US 6,327,301 B1
(45) Date of Patent: *Dec. 4, 2001

(54) DETECTION AND ADAPTATION TO DIGITAL NETWORK IMPAIRMENTS BY PCM MODEMS

(75) Inventors: Victor Demjanenko, Pendleton, NY (US); Frederic J. Hirzel, Sunnyvale, CA (US)

(73) Assignee: Vocal Technologies, Ltd., Buffalo, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,821

(22) Filed: Mar. 3, 1998

Related U.S. Application Data

(60) Provisional application No. 60/038,570, filed on Mar. 3, 1997.

(51) Int. Cl.[7] .............................. H04B 1/38; H04M 1/64
(52) U.S. Cl. ................................. 375/222; 379/94
(58) Field of Search .................... 375/222, 225, 375/220, 242; 379/94, 97, 98; 370/385, 278, 282

(56) References Cited

U.S. PATENT DOCUMENTS

| | | | | |
|---|---|---|---|---|
| 5,663,982 | * | 9/1997 | Hodge et al. | 375/222 |
| 5,671,251 | * | 9/1997 | Blackwell et al. | 375/222 |
| 5,754,594 | * | 5/1998 | Betts et al. | 375/285 |

* cited by examiner

Primary Examiner—Chi Pham
Assistant Examiner—Khai Tran
(74) Attorney, Agent, or Firm—Foley & Lardner

(57) ABSTRACT

A method of compensating for systemic impairments in a telecommunications network is disclosed. The method may involve transmitting a candidate set of digital symbols from a digital model to an analog modem, processing an analog representation of said candidate set of digital symbols in the analog modem, deriving a set of data information symbols from the analog representation of the candidate set of digital symbols, transmitting a representation of the data information symbols from the said analog modem to the digital modem, and using the representation of the data information symbols in digital modem for subsequent transmission of data from the digital modem. The method may also include the preceding steps of sending digital symbols from the digital modem to the analog modem, converting the digital symbols into analog signals in the telephone network, processing the analog signals in the analog modem, and training a receiver of the analog modem to recognize changes in the analog signals that correspond to known changes in digital symbols transmitted by the digital modem.

4 Claims, 7 Drawing Sheets

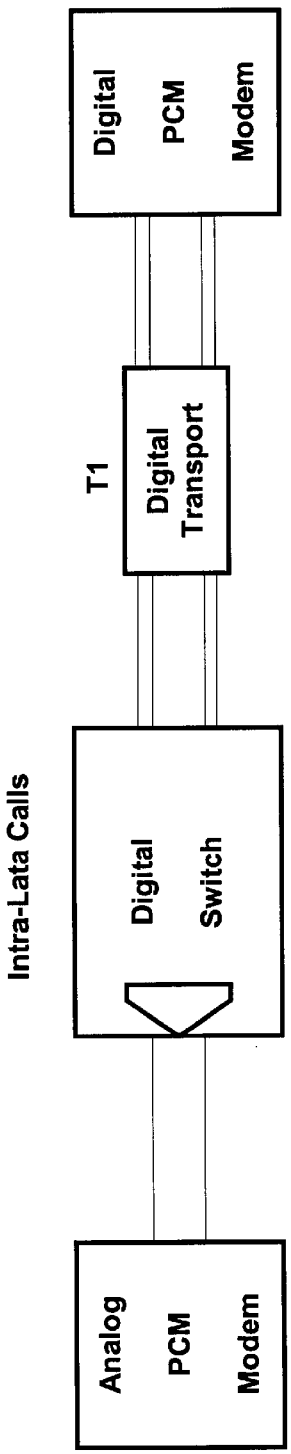
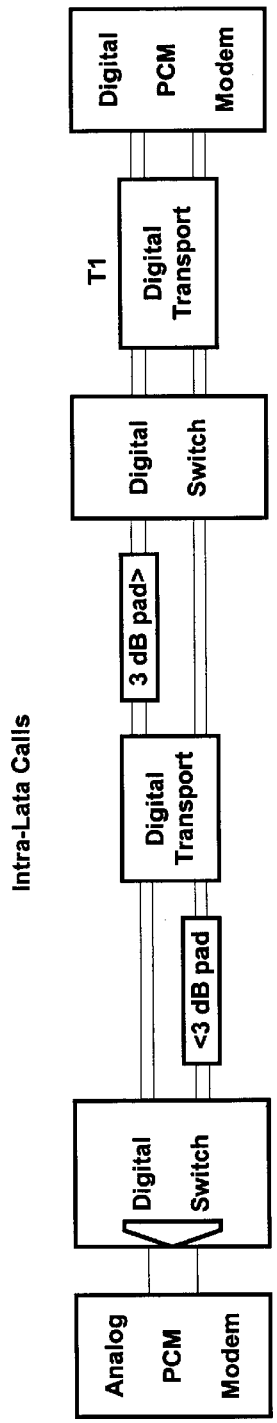
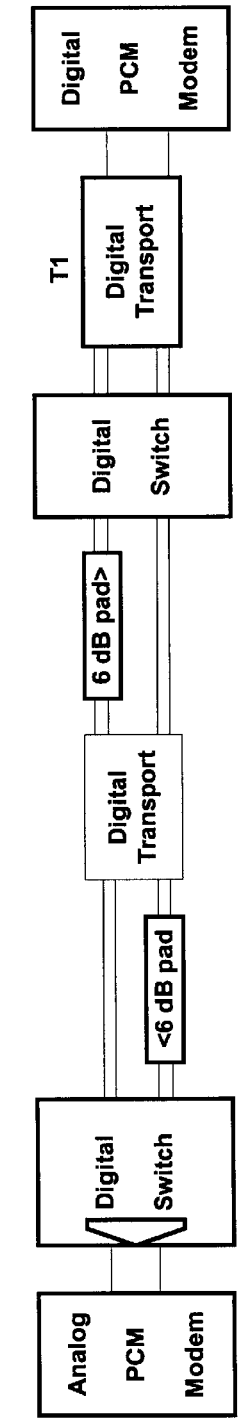
Figure 2A Prior Art
Figure 2B Prior Art
Figure 2C Prior Art

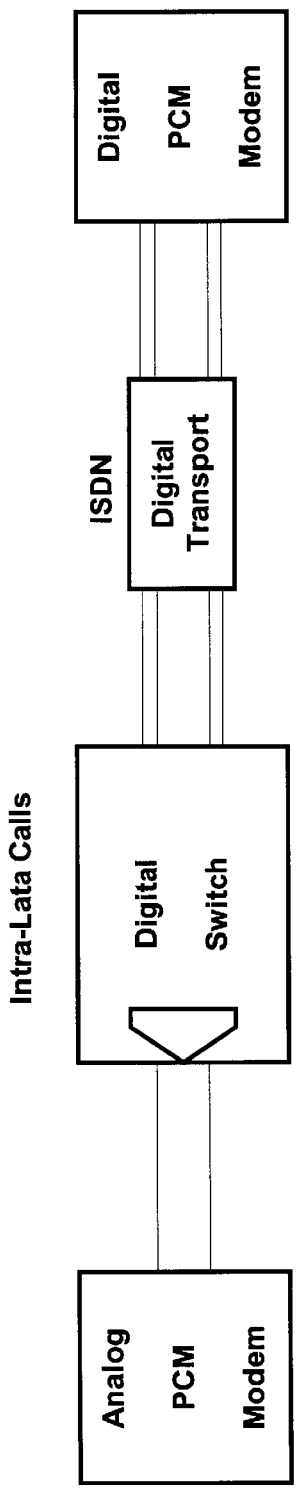
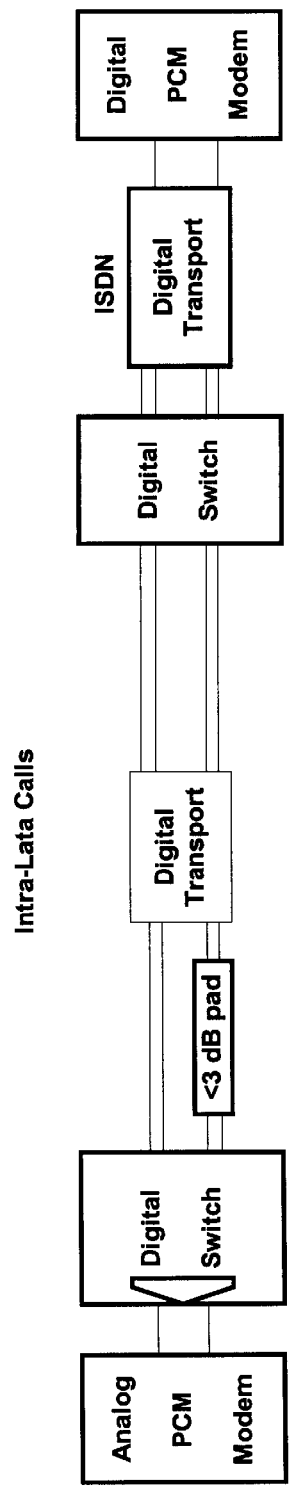
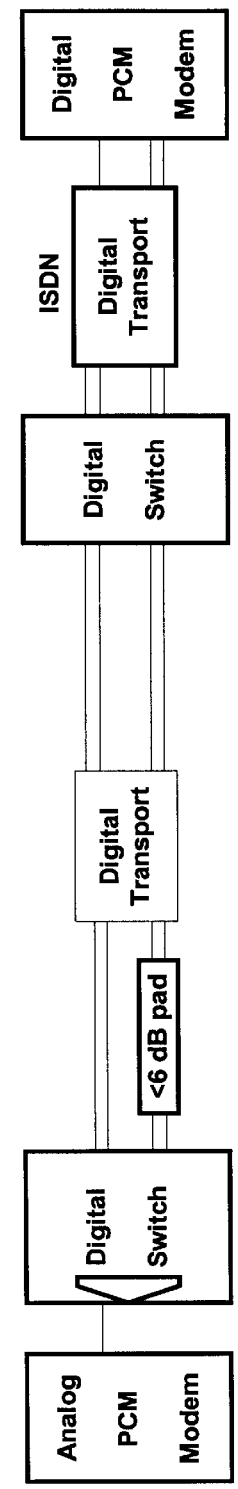

| ULaw | Segment | Step | Sign | Exponent | Magnitude | Linear | Decision | Average | 6 dB pad | PCM | Error | Duplicate | 3 dB pad | PCM | Error | Duplicate |
|---|---|---|---|---|---|---|---|---|---|---|---|---|---|---|---|---|
| | | | | | | | | | 1.99526 in linear | | | | 1.41254 in linear | | | |
| 255 | 15 | 15 | 1 | 1 | 0 | 0 | 0 | 0 | 0 | 0 | 0 | 0 | 0 | 0 | 0 | 0 |
| 254 | 15 | 14 | 1 | 1 | 1 | 2 | 1 | 2 | 1.00237 | 2 | -0.99763 | 0 | 1.41589 | 2 | -0.58411 | 0 |
| 253 | 15 | 13 | 1 | 1 | 2 | 4 | 3 | 4 | 2.00475 | 2 | 0.00475 | 1 | 2.83178 | 2 | 0.83178 | 1 |
| 252 | 15 | 12 | 1 | 1 | 3 | 6 | 5 | 6 | 3.00712 | 4 | -0.99288 | 0 | 4.24767 | 4 | 0.24767 | 0 |
| 251 | 15 | 11 | 1 | 1 | 4 | 8 | 7 | 8 | 4.0095 | 4 | 0.0095 | 0 | 5.66357 | 6 | -0.33643 | 0 |
| 250 | 15 | 10 | 1 | 1 | 5 | 10 | 9 | 10 | 5.01187 | 6 | -0.98813 | 0 | 7.07946 | 6 | -0.92054 | 0 |
| 249 | 15 | 9 | 1 | 1 | 6 | 12 | 11 | 12 | 6.01425 | 6 | 0.01425 | 1 | 8.49535 | 8 | 0.49535 | 1 |
| 248 | 15 | 8 | 1 | 1 | 7 | 14 | 13 | 14 | 7.01662 | 8 | -0.98338 | 0 | 9.91124 | 10 | -0.08876 | 0 |
| 247 | 15 | 7 | 1 | 1 | 8 | 16 | 15 | 16 | 8.019 | 8 | 0.019 | 1 | 11.3271 | 12 | -0.67287 | 0 |
| 246 | 15 | 6 | 1 | 1 | 9 | 18 | 17 | 18 | 9.02137 | 10 | -0.97863 | 0 | 12.743 | 12 | 0.74302 | 1 |
| 245 | 15 | 5 | 1 | 1 | 10 | 20 | 19 | 20 | 10.0237 | 10 | 0.02374 | 1 | 14.1589 | 14 | 0.15892 | 1 |
| 244 | 15 | 4 | 1 | 1 | 11 | 22 | 21 | 22 | 11.0261 | 12 | -0.97388 | 0 | 15.5748 | 16 | -0.42519 | 0 |
| 243 | 15 | 3 | 1 | 1 | 12 | 24 | 23 | 24 | 12.0285 | 12 | 0.02849 | 1 | 16.9907 | 16 | 0.9907 | 1 |
| 242 | 15 | 2 | 1 | 1 | 13 | 26 | 25 | 26 | 13.0309 | 14 | -0.96913 | 0 | 18.4066 | 18 | 0.40659 | 1 |
| 241 | 15 | 1 | 1 | 1 | 14 | 28 | 27 | 28 | 14.0332 | 14 | 0.03324 | 1 | 19.8225 | 20 | -0.17752 | 0 |
| 240 | 15 | 0 | 1 | 1 | 15 | 30 | 29 | 30 | 15.0356 | 16 | -0.96438 | 0 | 21.2384 | 22 | -0.76163 | 0 |
| 239 | 14 | 15 | 1 | 2 | 0 | 33 | 31 | 33 | 16.5392 | 16 | 0.53918 | 1 | 23.3622 | 24 | -0.63779 | 0 |
| 238 | 14 | 14 | 1 | 2 | 1 | 37 | 35 | 37 | 18.5439 | 18 | 0.54393 | 1 | 26.194 | 26 | 0.19399 | 1 |
| 237 | 14 | 13 | 1 | 2 | 2 | 41 | 39 | 41 | 20.5487 | 20 | 0.54868 | 1 | 29.0258 | 30 | -0.97422 | 0 |
| 236 | 14 | 12 | 1 | 2 | 3 | 45 | 43 | 45 | 22.5534 | 22 | 0.55343 | 1 | 31.8576 | 33 | -1.14244 | 0 |
| 235 | 14 | 11 | 1 | 2 | 4 | 49 | 47 | 49 | 24.5582 | 24 | 0.55817 | 1 | 34.6893 | 33 | 1.68934 | 1 |
| 234 | 14 | 10 | 1 | 2 | 5 | 53 | 51 | 53 | 26.5629 | 26 | 0.56292 | 1 | 37.5211 | 37 | 0.52113 | 1 |
| 233 | 14 | 9 | 1 | 2 | 6 | 57 | 55 | 57 | 28.5677 | 28 | 0.56767 | 1 | 40.3529 | 41 | -0.64709 | 0 |
| 232 | 14 | 8 | 1 | 2 | 7 | 61 | 59 | 61 | 30.5724 | 30 | 0.57242 | 1 | 43.1847 | 45 | -1.81531 | 0 |
| 231 | 14 | 7 | 1 | 2 | 8 | 65 | 63 | 65 | 32.5772 | 33 | -0.42283 | 0 | 46.0165 | 45 | 1.01648 | 1 |
| 230 | 14 | 6 | 1 | 2 | 9 | 69 | 67 | 69 | 34.5819 | 33 | 1.58192 | 1 | 48.8483 | 49 | -0.15174 | 0 |
| 229 | 14 | 5 | 1 | 2 | 10 | 73 | 71 | 73 | 36.5867 | 37 | -0.41333 | 0 | 51.68 | 53 | -1.31996 | 0 |
| 228 | 14 | 4 | 1 | 2 | 11 | 77 | 75 | 77 | 38.5914 | 37 | 1.59142 | 1 | 54.5118 | 53 | 1.51183 | 1 |
| 227 | 14 | 3 | 1 | 2 | 12 | 81 | 79 | 81 | 40.5962 | 41 | -0.40383 | 0 | 57.3436 | 57 | 0.34361 | 1 |
| 226 | 14 | 2 | 1 | 2 | 13 | 85 | 83 | 85 | 42.6009 | 41 | 1.60091 | 1 | 60.1754 | 61 | -0.82461 | 0 |
| 225 | 14 | 1 | 1 | 2 | 14 | 89 | 87 | 89 | 44.6057 | 45 | -0.39434 | 0 | 63.0072 | 65 | -1.99283 | 0 |
| 224 | 14 | 0 | 1 | 2 | 15 | 93 | 91 | 93 | 46.6104 | 45 | 1.61041 | 1 | 65.839 | 65 | 0.83896 | 1 |
| 223 | 13 | 15 | 1 | 3 | 0 | 99 | 95 | 99 | 49.6175 | 49 | 0.61754 | 1 | 70.0866 | 69 | 1.08663 | 1 |
| 222 | 13 | 14 | 1 | 3 | 1 | 107 | 103 | 107 | 53.627 | 53 | 0.62703 | 1 | 75.7502 | 77 | -1.2498 | 0 |
| 221 | 13 | 13 | 1 | 3 | 2 | 115 | 111 | 115 | 57.6365 | 57 | 0.63653 | 1 | 81.4138 | 81 | 0.41377 | 1 |
| 220 | 13 | 12 | 1 | 3 | 3 | 123 | 119 | 123 | 61.646 | 61 | 0.64603 | 1 | 87.0773 | 89 | -1.92267 | 0 |
| 219 | 13 | 11 | 1 | 3 | 4 | 131 | 127 | 131 | 65.6555 | 65 | 0.65553 | 1 | 92.7409 | 93 | -0.2591 | 0 |
| 218 | 13 | 10 | 1 | 3 | 5 | 139 | 135 | 139 | 69.665 | 69 | 0.66503 | 1 | 98.4045 | 99 | -0.59554 | 0 |
| 217 | 13 | 9 | 1 | 3 | 6 | 147 | 143 | 147 | 73.6745 | 73 | 0.67452 | 1 | 104.068 | 107 | -2.93197 | 0 |
| 216 | 13 | 8 | 1 | 3 | 7 | 155 | 151 | 155 | 77.684 | 77 | 0.68402 | 1 | 109.732 | 107 | 2.7316 | 1 |
| 215 | 13 | 7 | 1 | 3 | 8 | 163 | 159 | 163 | 81.6935 | 81 | 0.69352 | 1 | 115.395 | 115 | 0.39516 | 1 |
| 214 | 13 | 6 | 1 | 3 | 9 | 171 | 167 | 171 | 85.703 | 85 | 0.70302 | 1 | 121.059 | 123 | -1.94127 | 0 |
| 213 | 13 | 5 | 1 | 3 | 10 | 179 | 175 | 179 | 89.7125 | 89 | 0.71251 | 1 | 126.722 | 123 | 3.7223 | 1 |

DETECTION AND ADAPTATION TO DIGITAL NETWORK IMPAIRMENTS BY PCM MODEMS

This application claims benefit of Prov. No. 60/038,570 filed Mar. 3, 1997.

FIELD OF THE INVENTION

The invention relates to modem technology, more particularly to PCM modem technology, and more particularly to a method for detecting and adapting to digital network impairments in a PCM modem.

BACKGROUND OF THE INVENTION

PCM modem technology as proposed requires no changes need to be made in the existing telecommunications system. Much attention has been paid to impairments affecting the local analog loop. However, there are several known digital impairments which can equally affect the performance of the PCM modems. The known impairments are the following:

a) Digital attenuation pads (3 dB and 6 dB)

b) Robbed bit signaling c) PCM sample slips d) PCM code conversions

It would be impractical to require the telephone carriers to change their transmission facilities. These digital impairments can and should be accommodated by PCM modems. Each of the above-identified impairments is further discussed below.

Digital Attenuation Pads

The network model diagrams for evaluation of PCM modems described in Sierra Semiconductor, "Liaison to TR30.1 Concerning PCM Modems," Ft. Lauderdale, Jan. 23–24, 1997, Doc. FL-08, and Intel, "Proposed Provisional PCM Modem Network Model," Ft. Lauderdale, Jan. 23–24, 1997, Doc. FL-02, show configurations with 3 and 6 dB pads within the digital transport/switching network. FIG. 1 presents the network model of the Intel paper, which illustrates the two-wire analog to four-wire digital PCM interface. Included in the interface are the A/D and DIA converters that process input and output of the PCM modem, analog attenuation elements including IMD and RTDIAD/EDD elements, noise generators summed with transmitted signals and a balance network interface. G.121 further identifies additional attenuation pads used by various countries outside of North America. These pads are implemented via digital circuits or ROMs which provide a systematic remapping of PCM codes to other PCM codes. This mapping to a new space in the digital network is invariant for a telephone connection.

Conventional PCM modem technology relies on the network being digital with a single DIA converter in the path between the digital modem and the analog modem. During training, PCM modems will determine whether the channel can support the technology. If the network connection cannot support the PCM mode (i.e. offer a higher data rate than can be achieved with V.34), the modems will either fall back to another mode (e.g. V.34) or disconnect. However, there are a variety of different network configurations having differing digital attenuation elements. FIGS. 2a–2f illustrate various existing network configurations deployed between an analog PCM modem and a digital PCM modem. It is seen by comparison of these figures that a variety of configurations involving various combinations of digital switches, digital transport, and 3 dB and 6 dB attenuation pads are possible.

Accordingly, since significant variation exists in the implementation of attenuation pads, static predetermination of all possible remappings of PCM codes to other PCM codes is not viable.

Robbed Bit Signaling

Robbed bit signaling is used on North American telephone trunks for interoffice signaling. The least significant bit of every sixth PCM sample is used for signaling. Within the telephone network from end-to-end, typically two PCM samples within every six may be used for signaling, although in the worst case it may be all six. The effect of this impairment is the inability to convey information in this bit position. It further may affect PCM code transformations due to attenuation pads or law conversions.

PCM Sample Slips

PCM sample slips occur for purposes of synchronization within the telephone network or between telephone networks. Either a PCM sample is completely dropped or repeated. Detection of such impairments relies on redundancy or trellis coding or forward error correction of some form.

PCM Code Conversions

PCM code conversions between u-aw and A-law occur over international calls. This is a systematic mapping of codes from one law to the other. This mapping is not exactly one to-one according to the recommendations in G.711.

Regulatory Analog Transmission Power Limits

In addition to the digital impairments, telecommunications regulatory agencies have established power limits for circuits which terminate in an analog local loop, see Communications Certification Laboratory, "Liaison to T1A1.7 and TR30.1 on FCC Part 68 Compliance for PCM Modems," Ft. Lauderdale, Jan. 23–24, 1997, Doc. FL-10. This limitation is a result of real implementation restrictions already within the deployed telephone equipment.

The highest data rates in the downstream direction (from the digital to the analog modem) can only be achieved if all of the $\mu$-law encoded levels can be used. However, the average energy of a sequence that uses all 255 $\mu$-law levels with equal probability is well above the maximum permitted transmit power level of –12 dBm0 specified in FCC part 68.

Thus it is apparent that the need to comply with this limitation requires use of a subset of the available PCM codes in the set of PCM symbols to be used for the high speed data transmission. Non-equally probably mappings (i.e. shell mapping) could be used to alter and control the probability distribution of each of the PCM codes in the set of symbols. Even with non-equally probably mapping techniques, the analysis in RSA Communications, "$\mu$-law signal power," Orlando, Dec. 4, 1996, Doc. Orlando —10R#, suggests that both the highest and lowest segments of the $\mu$-law codes would not be used. The highest segments are eliminated because of signal power limits. The lowest are eliminated to increase the minimum distance between signal values.

SUMMARY OF THE INVENTION

The invention provides a means of detecting the presence of attenuation pads (3 dB or 6 dB) in the analog PCM modem, a determination of an appropriate set of PCM symbols for greatest data rates and communication of the attenuation and/or the selected set of PCM symbols to the digital modem. Without selection of alternate sets of PCM symbols, the data rate would be reduced and/or more problematic to receive without error when digital attenuation is present. The techniques of the invention eliminate the need for uniqueness in mapping for successful interoperation of L-law and A-law codes. Accordingly, the invention may be embodied in a method of compensating for systemic impairments in a telecommunications network. The method may involve transmitting a candidate set of digital symbols from a digital modem to an analog modem, processing an analog representation of said candidate set of digital symbols in the analog modem, deriving a set of data information symbols from the analog representation of the candidate set of digital symbols, transmitting a representation of the data information symbols from the said analog modem to the digital modem, and using the representation of the data information symbols in digital modem for subsequent transmission of data from the digital modem. The method may also include the preceding steps of sending digital symbols from the digital modem to the analog modem, converting the digital symbols into analog signals in the telephone network, processing the analog signals in the analog modem, and training a receiver of the analog modem to recognize changes in the analog signals that correspond to known changes in digital symbols transmitted by the digital modem.

DESCRIPTION OF THE DRAWINGS

FIGS. 2a–2f show various existing network configurations deployed between an analog PCM modem and a digital PCM modem;

FIGS. 3a–3c show a table of $\mu$-law values 255–128 and their corresponding PCM values after attenuation by 6 dB and 3 dB pads.

DETAILED DESCRIPTION OF THE PREFERRED EMBODIMENT

Detection of Digital Impairments

Figure 1:
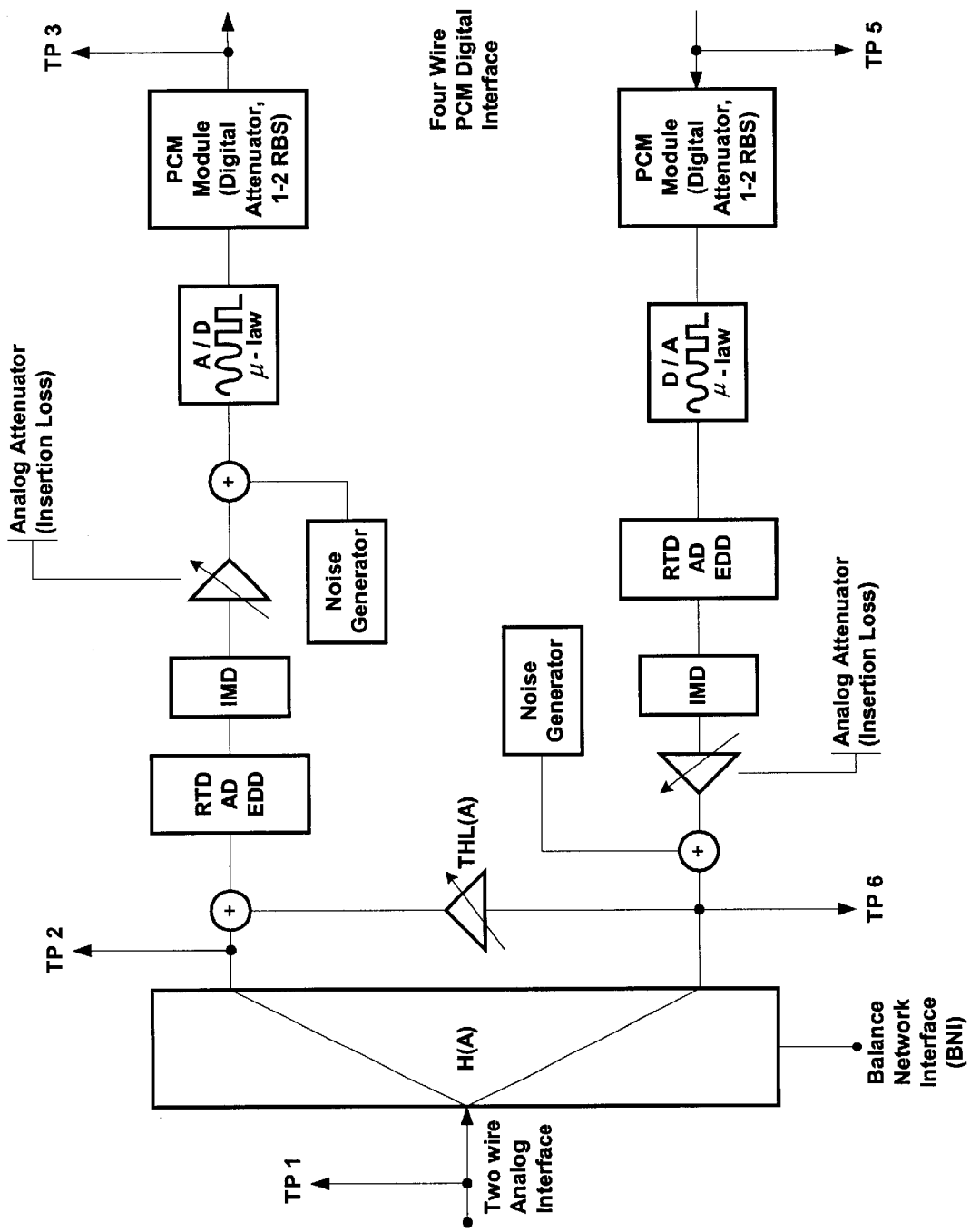
FIG. 1 shows a model of a two-wire analog to four-wire digital PCM interface.

PCM modems are sensitive to timing slips in two phases of its operation: training and steady state. If they occur during training they will corrupt the training process and training has to be reinitiated. Mechanisms that provide for fast recovery of training failure due to timing slips is required. PCM timing slips that occur during steady state require a resynchronization of the data stream. While detection and resynchronization may be accomplished solely by the receiver, this is problematic and complicated when trellis decoding is used. Use of two different forms of renegotiation though would provide both seamless without resynchronization and "seamed" with resynchronization. The "seamed" would only be used when PCM sample resynchronization is required. A PCM sample slip will also affect some of the other digital impairments, mainly robbed bit signaling, which will need to be re-determined.

For the detection of the other digital impairments, a training sequence at the end of Phase 3 in a preferred embodiment uses all PCM magnitude values in a mid-band frequency. Several sequences exist which will produce all valid PCM codes and whose energy content is concentrated in the center of the receive band. This sequence should be able to be received with great reliability. Use of such a sequence would allow detection of the digital network impairments.

Prior to receiving this portion of the training sequence, the analog PCM modem must have its equalizer trained and have an estimate of the S/N (without its echo canceller in operation) in the analog local loop. For all PCM magnitudes received as part of the training sequence, the receiver can then determine all PCM codes which can be uniquely received and sets of PCM codes which are indistinguishable for its observed S/N. PCM codes can be indistinguishable due to attenuation pads, robbed bit signaling and law conversions.

Figure 3B:
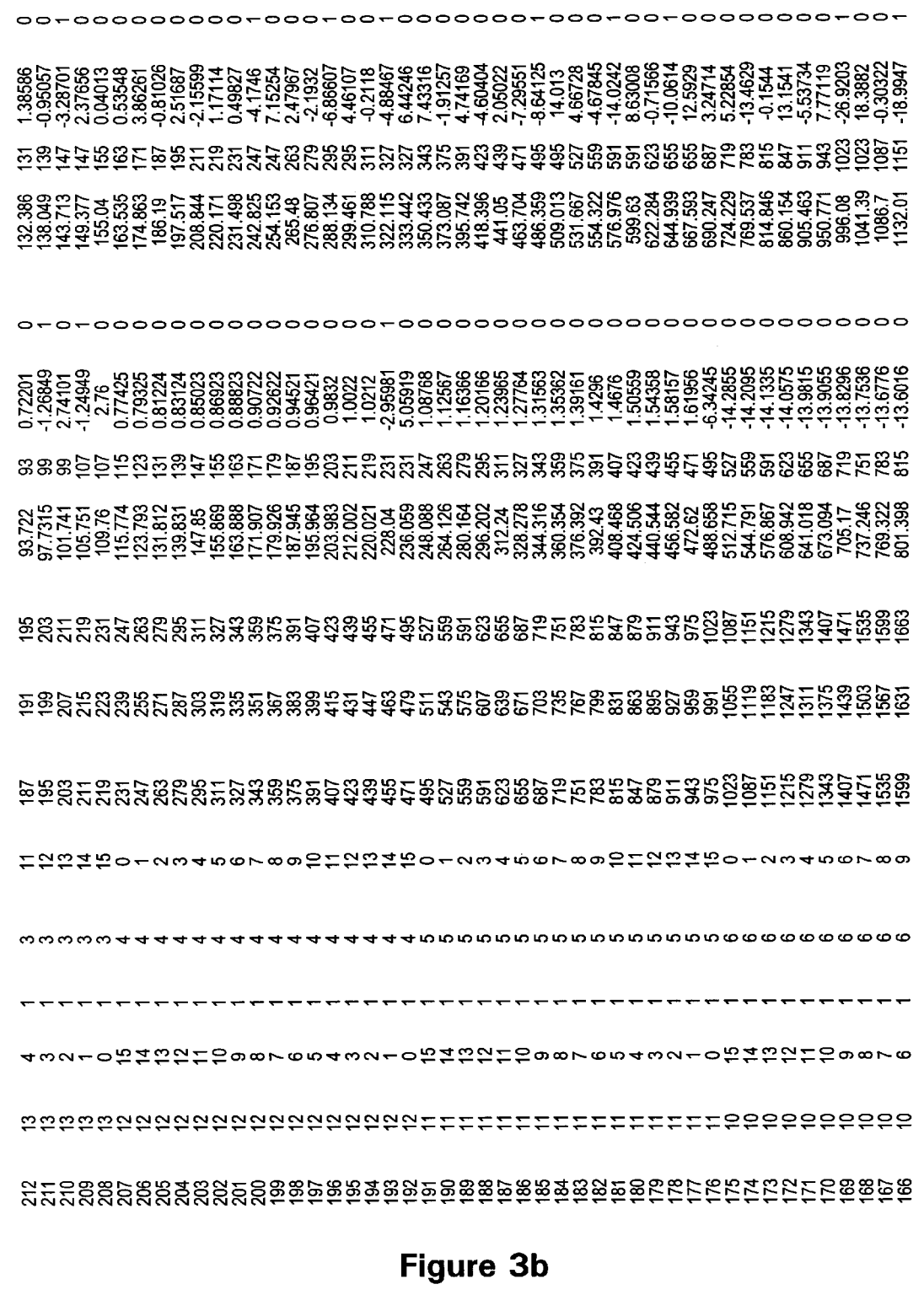
Figure 3C:
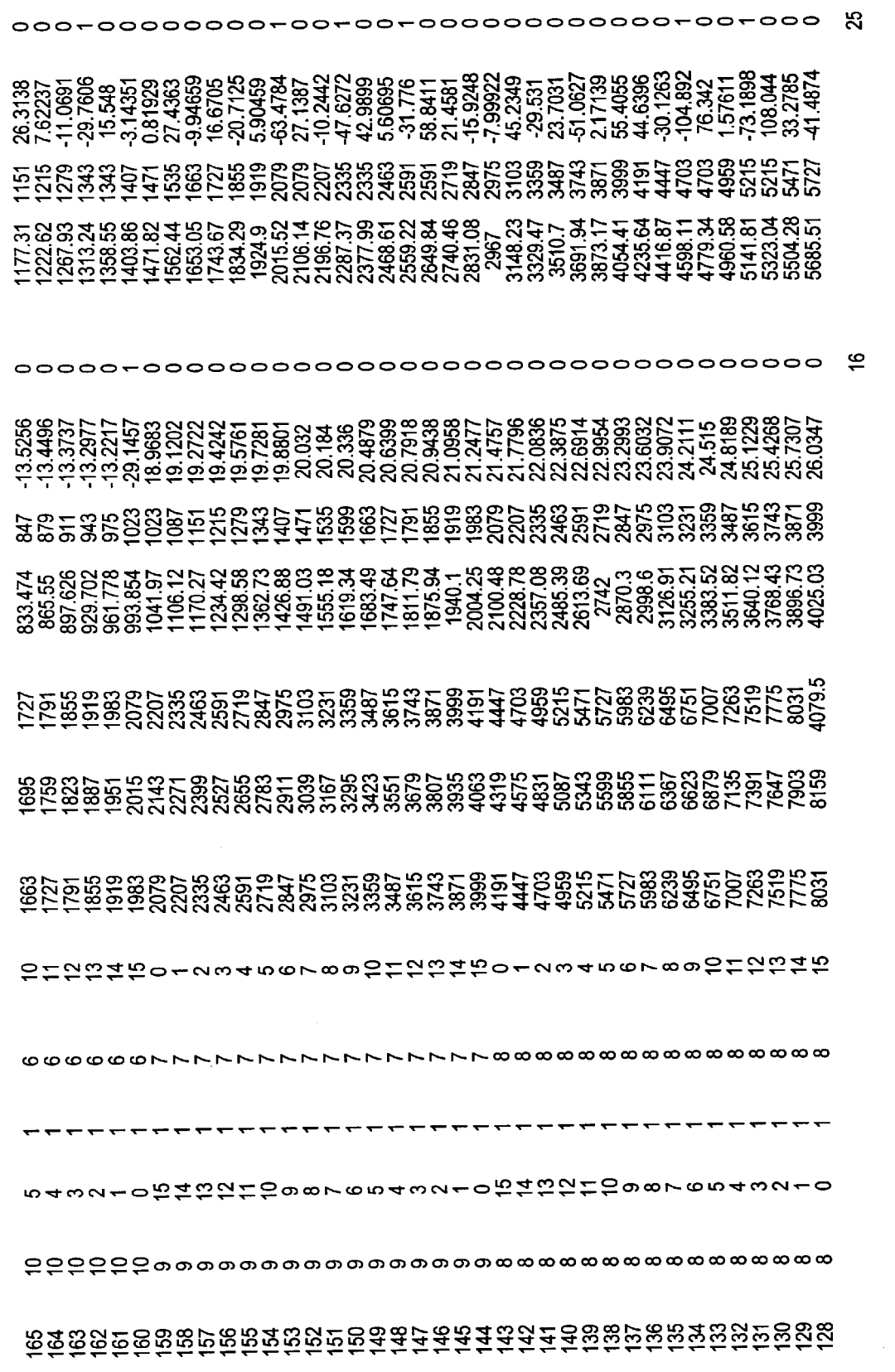

FIGS. 3a–3c show a table of $\mu$-law values 255–128 and their corresponding PCM values after attenuation by 6 dB and 3 dB pads. It is seen in the table that certain $\mu$-law values produce identical PCM values, and hence cannot be used to transmit unique information through the network. By excluding $\mu$-law values that produce duplicates, a set of unique $\mu$-law values for the network conditions is realized.

In a preferred embodiment, the training sequence may be repeated, shifted by successive numbers of samples (1 to 5), in order to uniquely identify bit positions used for robbed bit signaling. This would allow the analog modem to make a determination of the precise set of systematic PCM code mappings which are uniquely received for each of the six bit positions.

In practice, the approach of repeating for each of the possible robbed bit positions may require transmission of a fairly lengthy sequence approaching 100 msec in duration. This can be avoided if the convention first assumes that the LSB of every PCM code is corrupted. Then once the digital modem reaches steady state, the digital PCM modem produces some known synchronizing pattern in all of the LSB's. The analog PCM modem would attempt to detect the synchronizing pattern and once detected, it could signal to the digital PCM modem via a seamless rate change the usability of the particular LSB(s) for carrying data. This mechanism would also significantly aid recovery from PCM sample slip as described earlier.

Analysis of Detection Results

Once the analog modem has determined all PCM codes which can be uniquely received and all sets of indistinguishable systematic PCM code mappings due to attenuation pads, robbed bit signaling and law conversions, some or all of this information can be conveyed to the digital PCM modem. The digital PCM modem would then be able to avoid the indistinguishable codes (or least not use different codes within the set of indistinguishable codes for conveying different information bits) and the robbed bits.

By analyzing the sets of indistinguishable PCM codes, it is possible to determine the digital telephone network attenuation. For example, Hayes Microcomputer Products, Inc., "Digital Trunk Loss," Ft. Lauderdale, Jan. 23–24, 1997, Doc. FL-07, shows a set of 32 PCM codes for 16 sets of indistinguishable codes after mapping through a 6.0206 dB attenuation pad. For a 3 dB attenuation pad, 25 sets of indistinguishable codes result after mapping. These sets of indistinguishable PCM codes, and even just a subset of these sets, can thus be an unambiguous characteristic of the 3 and 6 dB digital attenuation pads in the telephone network. A subset for either the 6 or 3 dB pads would consist of checking the indistinguishable codes corresponding to some arbitrary number of the larger characteristic indistinguishable PCM codes.

Additional analysis of the lowest level indistinguishable PCM codes will reveal those which are below the real or expected noise floor of the receiver. The receiver's estimate of S/N and knowledge of the noise contributed by its AFE and local echo canceller can be used to establish a threshold below which received PCM codes cannot be distinguished. This could then be used to restrict usage of such PCM codes in the data transfer from the digital PCM modem to the analog PCM modem.

Figure 4:
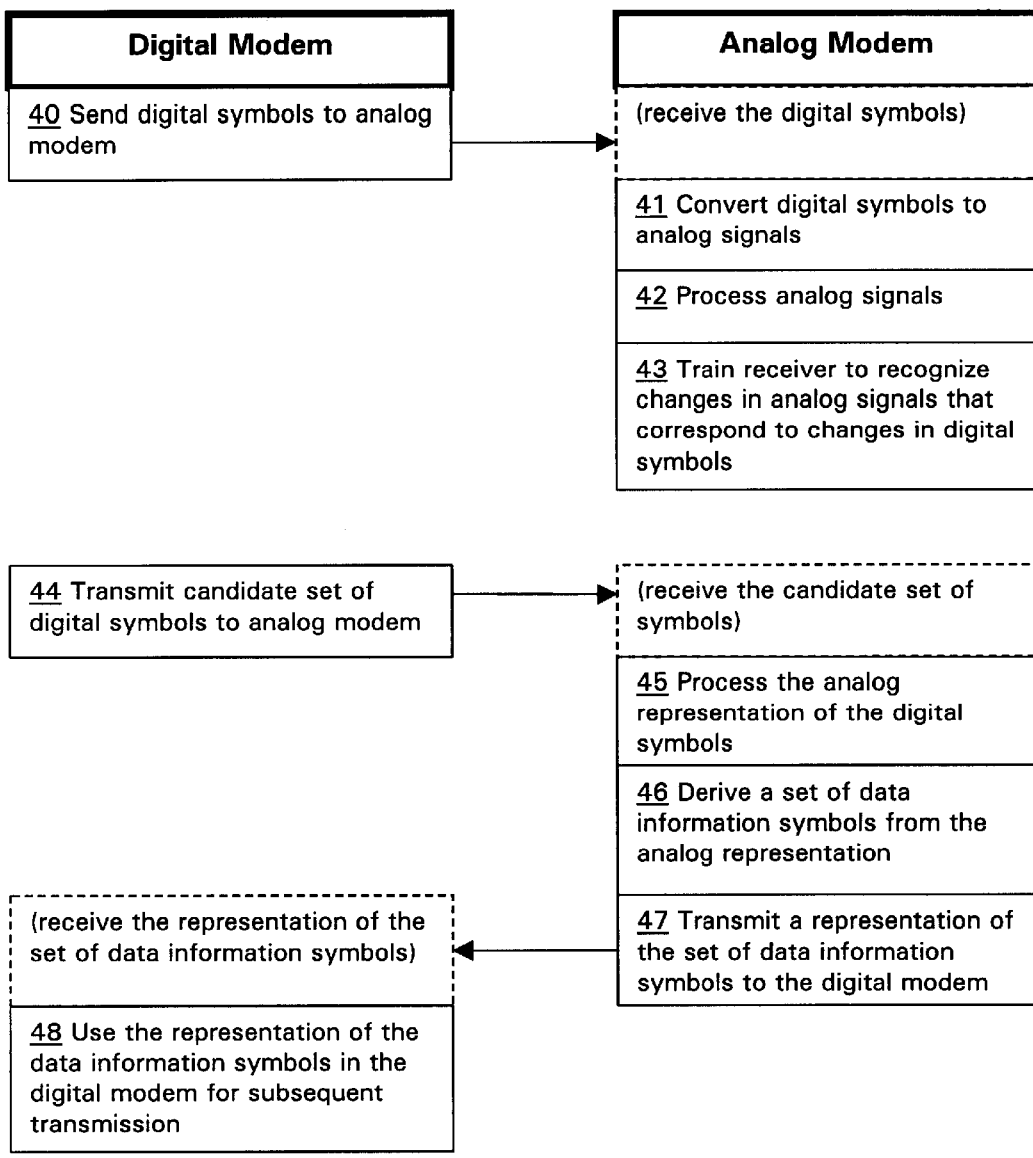
FIG. 4 illustrates a method in a telecommunications network for compensating for systemic impairments.

Thus, the invention may be embodied in a method in a telecommunications network for compensating for systemic impairments. FIG. 4 illustrates this method. The method may include a conventional training sequence that includes sending 40 digital symbols from a digital modem to an analog modem, converting 41 the digital symbols into analog signals in the telephone network, processing 42 the analog signals in the analog modem, and training 43 a receiver of the analog modem to recognize changes in the analog signals that correspond to known changes in the digital symbols transmitted by the digital modem. Systemic impairments are then compensated by transmitting 44 a candidate set of digital symbols from said digital modem to said analog modem, processing 45 an analog representation of said candidate set of digital symbols by said analog modem, deriving 46 a set of data information symbols from said analog representation of said candidate set of digital symbols, transmitting 47 a representation of said data information symbols from said analog modem to said digital modem, and using 48 said representation of said data information symbols by said digital modem for subsequent transmission of data from said digital modem Adaptation to Digital Network Attenuation In a simple implementation, there can be three predetermined sets of PCM symbols. One for 0 dB attenuation, one for 3 dB attenuation and one for 6 dB attenuation. All of the sets of PCM symbols would have been pre-determined to meet the FCC power limitations with no attenuation, 3 dB attenuation or 6 dB attenuation. Further some PCM codes could be reserved as substitutes in case some sets of additional PCM codes are indistinguishable.

Alternatively, the mapping technique (i.e. shell mapping) used for selecting codes within the predetermined PCM symbol set can apply a different distributions in the case of 0 dB, 3 dB or 6 dB attenuation. Again the power limitations can be met for the analog local loop.

The determination of the adaptation to apply can be done by either both analog and digital PCM modems, or can be performed by one modem and communicated to the other. For simplification, in a preferred embodiment the analog PCM modem may determine the adaptation to be applied and communicate this to the digital PCM modem along with any other significant indistinguishable PCM codes and robbed bit position(s).

Once the digital PCM modem starts the high speed data transfer, the selected set of PCM symbols and mapper distribution would reliably be remapped to a set of PCM values that a) meet the FCC power limitations at the analog local loop, and b) can be received by the analog PCM modem and unmapped to the symbols or bit stream originally encoded by the digital PCM modem.

The transfer of downstream data would occur at higher bit rates than if a single set of PCM values and single mapper distribution was used without any compensation for the digital network attenuation.

The method described above may be employed in a PCM modem to determine and adapt to various digital network impairments which are crucial for optimal PCM modem operation.

Specifically, this procedure provides a mechanism for detecting the digital network attenuation and selection of a set of PCM symbols and/or a different mapping distribution to compensate for the detected digital network attenuation. As a result of the systematic mapping within the digital network, this adaptation can reliably honor the FCC power limitations and can provide for the highest rates of throughput irrespective of the digital network attenuation. It is preferred that this approach be adopted in the TIA standard. The incorporation of this technique into the standard will be very straightforward and allow for greater network coverage [approximately of an additional 60%] at of higher data rates than would be possible with no such adjustment [approximately 25%].

What we claim is:

1. A method of compensating for systemic impairments in a, telecommunications network, comprising:

transmitting a candidate set of digital symbols from a digital mode into an analog modem;

processing an analog representation of said candidate set of digital symbols by said analog modem;

deriving a set of data information symbols from said analog representation of said candidate set of digital symbols, the set of data information symbols consisting of digital symbols that can be uniquely received by the analog modem;

transmitting a representation of said data information symbols from said analog modem to said digital modem; and, using said representation of said data information symbols by said digital modem for subsequent transmission of data from said digital modem.

2. A method of compensating for systemic impairments in a telecommunications network, comprising:

sending digital symbols from a digital modem to an analog modem;

converting said digital symbols into analog signals;

processing said analog signals by an analog modem;

training a receiver of said analog modem to recognize changes in said analog signals that correspond to known changes in digital symbols transmitted by the digital modem;

transmitting a candidate set of digital symbols from said digital [model] modem to said analog modem;

processing an analog representation of said candidate set of digital symbols by said analog modem;

deriving a set of data information symbols from said analog representation of said candidate set of digital symbols, the set of data information symbols consisting of digital symbols that can be uniquely received by the analog modem;

transmitting a representation of said data information symbols from said analog modem to said digital modem; and, using said representation of said data information symbols by said digital modem for subsequent transmission of data from said digital modem.

3. A method of communication in a digital modem, comprising:

transmitting a candidate set of digital symbols to an analog modem through a telecommunications network;

receiving a representation of a set of data information symbols from the analog modem, the set of data information symbols consisting of digital symbols of the candidate set that can be uniquely received by the analog modem through the network; and using the set of data information symbols for subsequent transmission of data to the analog modem.

4. A method of communication in an analog modem, comprising:

receiving a candidate set of digital symbols from a digital modem through a telecommunications network;

processing an analog representation of the candidate set of digital symbols;

deriving a set of data information symbols from the analog representation of the candidate set of digital symbols, the set of data information symbols consisting of digital symbols that can be uniquely received by the analog modem through the network; and transmitting a representation of the set of data information symbols to the digital modem.

* * * * *

UNITED STATES PATENT AND TRADEMARK OFFICE
CERTIFICATE OF CORRECTION

PATENT NO.    : 6,327,301 B1
DATED         : December 4, 2001
INVENTOR(S)   : Victor Demjanenko, Frederic J. Hirzel It is certified that error appears in the above-identified patent and that said Letters Patent is hereby corrected as shown below:

Column 1,
Row 41, "DIA" should read, -- D/A --
Row 42, "modern" should read, -- modem --
Row 43, "RTDIAD/EDD" should read, -- RTD/AD/EDD --
Row 52, "DIA" should read, -- D/A --

Column 2,
Row 63, "L-Law" should read, -- µ-Law --

Column 5,
Row 61, "mode into" should read, -- modem to --

Column 6,
Row 24, "[model]" should be deleted

Signed and Sealed this

Ninth Day of April, 2002

*Attest:*

*Attesting Officer*

JAMES E. ROGAN
*Director of the United States Patent and Trademark Office*